(12) United States Patent
Kitoh et al.

(10) Patent No.: US 6,924,573 B2
(45) Date of Patent: Aug. 2, 2005

(54) MOTOR HAVING CONTROL CIRCUIT BOARD AND MANUFACTURING METHOD THEREOF

(75) Inventors: Kazuto Kitoh, Toyohashi (JP); Takayoshi Aoyama, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/827,244

(22) Filed: Apr. 20, 2004

(65) Prior Publication Data

US 2004/0212263 A1 Oct. 28, 2004

(30) Foreign Application Priority Data

Apr. 25, 2003 (JP) ........................................ 2003-122923

(51) Int. Cl.[7] .............................................. H02K 5/00
(52) U.S. Cl. .......................................... 310/89; 310/71
(58) Field of Search ............................ 310/71, 83, 89, 310/42, 91, 68 R

(56) References Cited

U.S. PATENT DOCUMENTS

| | | | | |
|---|---|---|---|---|
| 5,063,317 A | * | 11/1991 | Bruhn | 310/91 |
| 5,245,258 A | * | 9/1993 | Becker et al. | 318/266 |
| 6,107,713 A | * | 8/2000 | Hulsmann et al. | 310/75 R |
| 6,191,512 B1 | * | 2/2001 | Lekeux et al. | 310/89 |
| 6,710,484 B2 | | 3/2004 | Kitoh et al. | 310/83 |

FOREIGN PATENT DOCUMENTS

EP 0 538 495 B1 4/1993

* cited by examiner

*Primary Examiner*—Dang Le
(74) *Attorney, Agent, or Firm*—Posz Law Group, PLC

(57) ABSTRACT

A control circuit board is received in a circuit board receiving case without being directly joined to the circuit board receiving case and has a circuit board side connector. The circuit board side connector is installed to a main body side connector of a gear housing in an installation direction parallel to a rotatable shaft of the motor main body to supply electric power to the motor main body through the main body side connector. A pin main body of a fixing pin is received into a fixing through hole of the control circuit board through a pin receiving through hole of the gear housing in a direction perpendicular to the installation direction of the circuit board side connector.

13 Claims, 10 Drawing Sheets

MOTOR HAVING CONTROL CIRCUIT BOARD AND MANUFACTURING METHOD THEREOF

CROSS REFERENCE TO RELATED APPLICATION

This application is based on and incorporates herein by reference Japanese Patent Application No. 2003-122923 filed on Apr. 25, 2003.

BACKGROUND OF THE INVENTION

1. Field of the Invention

The present invention relates to a motor that includes a motor main body, a speed reducing arrangement and a control device, which controls rotation of the motor main body and which is externally connected to the speed reducing arrangement that is, in turn, connected to the motor main body.

2. Description of Related Art

European Patent No. 0538495 B1 discloses such a motor. In the disclosed motor, a main body (a commutator motor) and a speed reducing arrangement (a transmission) are integrally assembled. A control device (an electronic unit) is externally connected to the speed reducing arrangement. The control device has a control circuit board, which includes a control circuit and is received in a circuit board receiving case (an electronic box). Then, the control device, which includes the control circuit board received in the circuit board receiving case, is installed to a housing (a transmission housing or a gear housing) of the speed reducing arrangement. At this time, a connector provided in the housing of the speed reducing arrangement is inserted into the circuit board receiving case and is connected to a connector provided in the control circuit board received in the circuit board receiving case. Thus, the control device is electrically connected to the motor main body and the speed reducing arrangement.

However, in the motor disclosed in European Patent No. 0538495 B1, the connector of the speed reducing arrangement is connected to the connector of the control circuit board in the circuit board receiving case, so that it is difficult to visually check the connection between these connectors.

To address the above disadvantage, the inventors of the present application have proposed to separately install the control circuit board and the circuit board receiving case to the housing of the speed reducing arrangement. More specifically, the connector of the control circuit board is connected to the connector of the housing of the speed reducing arrangement, so that the control circuit board is installed to the housing of the speed reducing arrangement. Then, the circuit board receiving case is installed to the housing of the speed reducing arrangement in such a manner that the circuit board installed to the housing of the speed reducing arrangement is received into the circuit board receiving case through an opening of the circuit board receiving case. Therefore, the control circuit board and the circuit board receiving case are both installed to the housing of the speed reducing arrangement. In this way, the connector of the circuit board is connected to the connector of the speed reducing arrangement before installation of the control circuit board into the circuit board receiving case, and thereby it is possible to visually check the connection between these connectors.

However, at the time of installation of the control device or at the time of replacing the control circuit board, the circuit board receiving case is installed or removed relative to the housing of the speed reducing arrangement while the control circuit board is still connected to the housing of the speed reducing arrangement. Here, the control circuit board is supported relative to the housing of the speed reducing arrangement only by the connector. Therefore, at the time of installing or removing the circuit board receiving case relative to the housing of the speed reducing arrangement, force, which likely causes substantial movement of the circuit board, can be applied to the control circuit board, and such force is likely concentrated in the connector. This causes damage to the connector.

It is conceivable to connect the control circuit board to the housing of the speed reducing arrangement through another connection to reduce stress applied to the connector. However, at the time of connecting the control circuit board to the housing of the speed reducing arrangement, for example, when torsional stress is applied to the control circuit board, it may cause damage to the control circuit board.

SUMMARY OF THE INVENTION

The present invention addresses the above disadvantages. Thus, it is an objective of the present invention to provide a motor, which includes a control circuit board connected to a gear housing that is, in turn, connected to a motor main body, and which minimizes stress applied to the control circuit board to effectively limit damage to the control circuit board. It is another objective of the present invention to provide a method for manufacturing such a motor.

To address the above objectives, there is provided a motor, which includes a motor main body, a gear housing, a control device and a fixing means. The motor main body includes a rotatable shaft, which is rotated upon energization of the motor main body. The gear housing is joined to the motor main body and receives an output shaft and a speed reducing mechanism. The speed reducing mechanism reduces a rotational speed of the rotatable shaft and conducts the reduced rotational speed of the rotatable shaft to the output shaft, and the gear housing has a main body side connector, from which electric power is supplied to the motor main body. The control device controls the motor main body and includes a control circuit board and a circuit board receiving case. The control circuit board is received in the circuit board receiving case without being directly joined to the circuit board receiving case and has a circuit board side connector. The circuit board side connector is installed to the main body side connector in a first direction to supply electric power to the motor main body through the main body side connector. The circuit board receiving case includes a gear housing side opening that is installed to the gear housing in the first direction to receive the control circuit board in the circuit board receiving case. The fixing means is for releasably fixing the control circuit board to the gear housing to prevent movement of the control circuit board relative to the gear housing in a second direction, which is opposite from the first direction.

To achieve the objectives of the present invention, there is also provided a method for manufacturing a motor. In the method, a control circuit board is installed to a gear housing in a first direction such that a circuit board side connector of the control circuit board is electrically connected to a main body side connector of the gear housing. Here, the gear housing is joined to a motor main body. Then, the control circuit board is releasably fixed to the gear housing by a fixing means to prevent movement of the control circuit board relative to the gear housing in a second direction, which is opposite from the first direction. Thereafter, a circuit board receiving case is installed to the gear housing in the first direction such that a gear housing side opening of the circuit board receiving case is connected to the gear housing to receive the control circuit board into the circuit board receiving case through the gear housing side opening of the circuit board receiving case.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
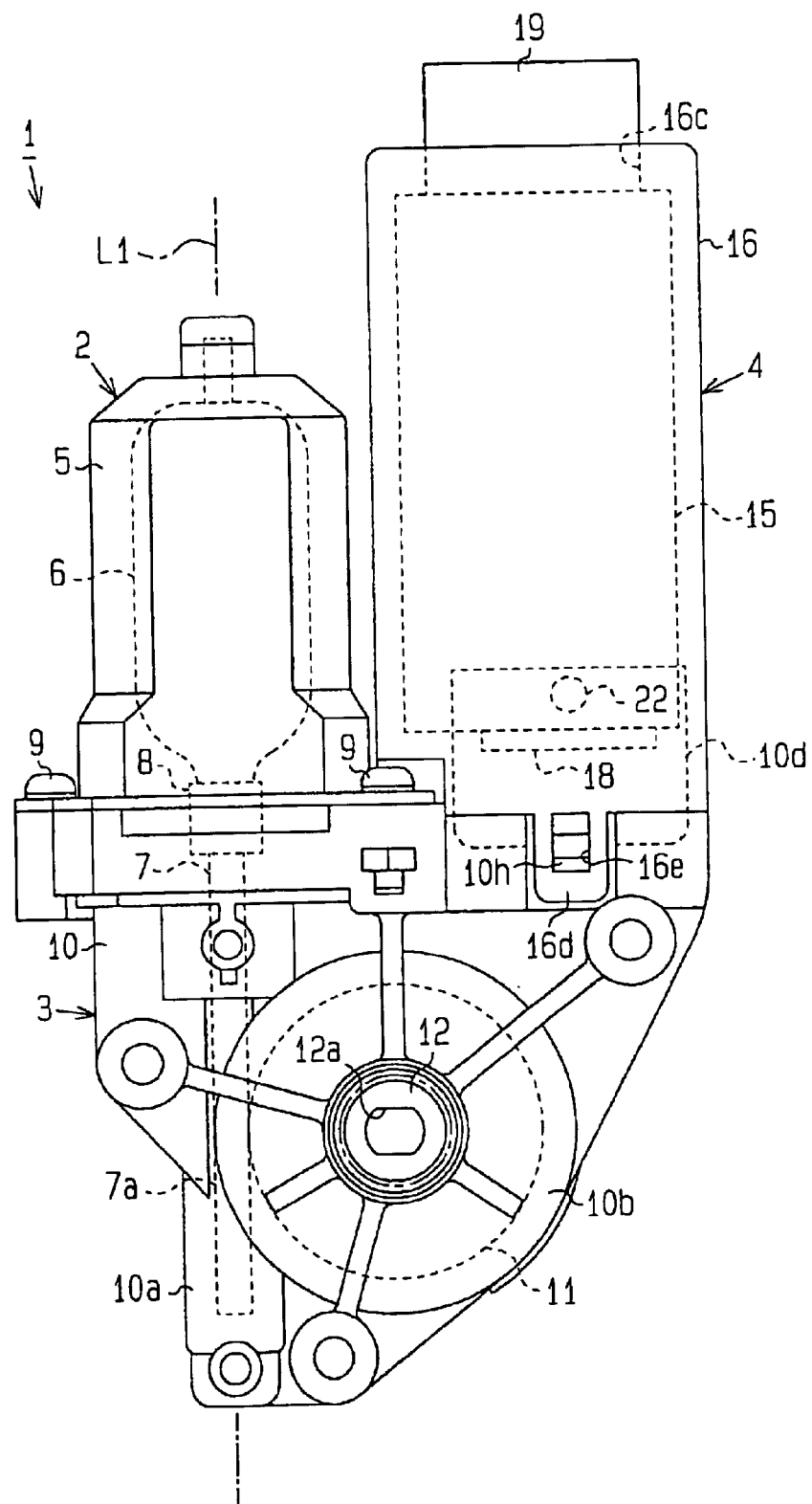
FIG. 1 is a plan view of a motor according to an embodiment of the present invention.

An embodiment of the present invention will be described with reference to the accompanying drawings.

With reference to FIGS. 1 to 8, a motor 1 according to the present embodiment is used as a drive source of a vehicle sunroof system and includes a motor main body 2, a speed reducing arrangement 3 and a control device 4, which are assembled together.

The motor main body 2 includes a yoke housing 5, which is made of a magnetic metal material and is formed into a cup shape. Magnets (not shown) are secured to an inner peripheral surface of the yoke housing 5. An armature 6 is rotatably received in the yoke housing 5 at a location radially inward of the magnets. The armature 6 includes a rotatable shaft 7, to which a commutator 8 is secured. The rotatable shaft 7 is inserted into a gear housing 10 of the speed reducing arrangement 3. The motor main body 2 (the yoke housing 5) is installed to the gear housing 10 in a direction parallel to an axis L1 of the rotatable shaft 7. The motor main body 2 and the gear housing 10 are connected together by a plurality of screws 9.

The gear housing 10 is made of a resin material. The gear housing 10 includes a rotatable shaft receiving portion 10a and a worm wheel receiving portion (a speed reducing mechanism receiving portion) 10b. The rotatable shaft receiving portion 10a receives the rotatable shaft 7, and the worm wheel receiving portion 10b receives a worm wheel (a speed reducing mechanism) 11. The gear housing 10 is generally flattened, so that the worm wheel receiving portion 10b extends from the rotatable shaft receiving portion 10a in one direction (a right direction in FIG. 1) that is perpendicular to the rotatable shaft receiving portion 10a (perpendicular to the axis L1 of the rotatable shaft 7). A plane of flattening of the flattened gear housing 10 is also a plane of flattening of the flattened motor 1.

The rotatable shaft 7 is rotatably received in the rotatable shaft receiving portion 10a. A worm 7a is integrally formed in the rotatable shaft 7.

The worm wheel 11 is rotatably received in the worm wheel receiving portion 10b. The worm wheel 11 is meshed with the worm 7a of the rotatable shaft 7. An output shaft 12 is integrally rotatably connected to the worm wheel 11. The output shaft 12 drives the sunroof system. Upon receiving the worm wheel 11, the worm wheel receiving portion 10b is closed by a cover 20, which is secured to the gear housing 10 by a plurality of screws 21.

The output shaft 12 has a connection hole 12a at a center of a distal end of the output shaft 12. The connection hole 12a has two opposed flat inner walls, which are parallel to one another, to receive a tool (not shown) into the connection hole 12a. At the time of a failure of the motor 1, when the output shaft 12 needs to be rotated, the tool is connected to the connection hole 12a of the output shaft 12 and is rotated to rotate the output shaft 12 to manually operate the sunroof system.

A fitting joint 10d is formed in the gear housing 10 at a location, which is on a worm wheel receiving portion 10b side of the rotatable shaft receiving portion 10a and is also a motor main body 2 side of the worm wheel receiving portion 10b. A circuit board receiving case 16 is fitted to, i.e., is installed to the fitting joint 10d in a direction parallel to the axis L1 of the rotatable shaft 7. The fitting joint 10d extends parallel to the axis L1 of the rotatable shaft 7 and is formed as a hollow body that has a hollow interior and a horse shoe shaped cross section without a side wall on a motor main body 2 side (FIG. 4) of the fitting joint 10d. Two rattling limiting protrusions 10e extend parallel to the axis L1 of the rotatable shaft 7 along an outer surface of an upper wall of the fitting joint 10d in FIG. 4.

Figure 3:
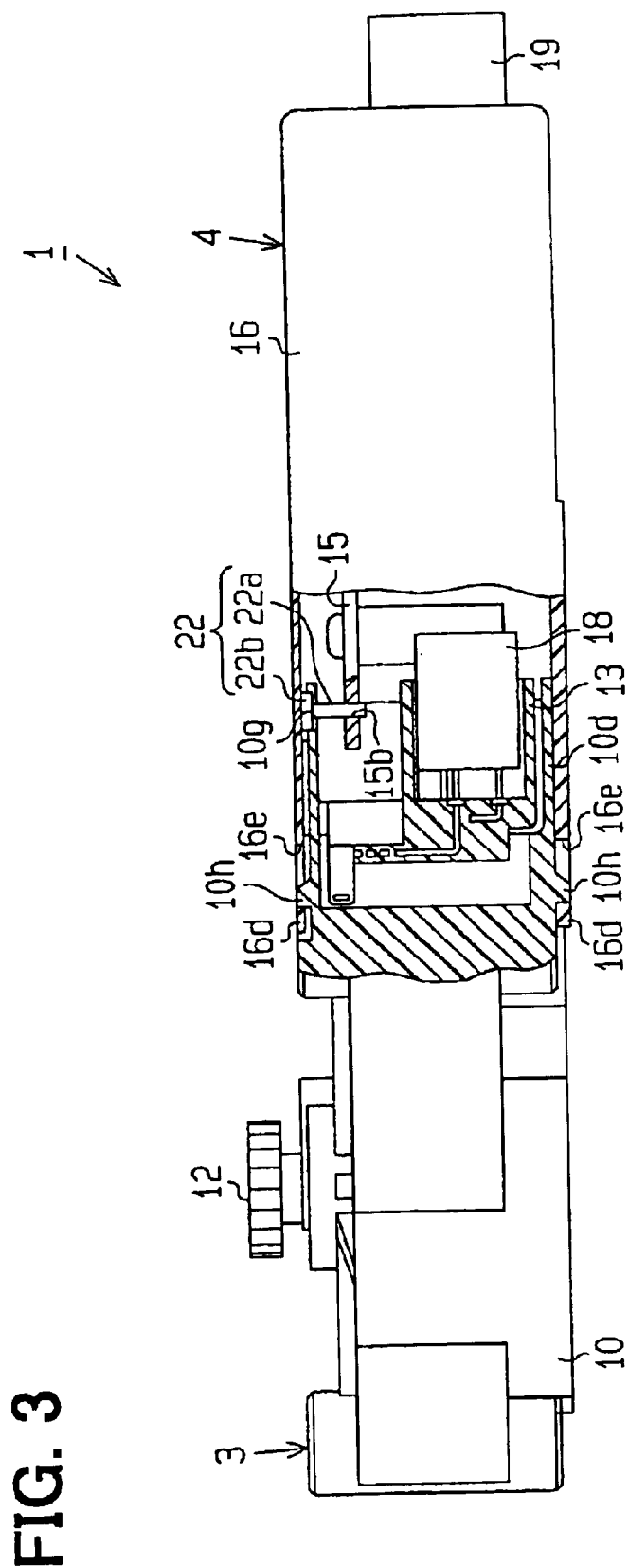
FIG. 3 is a partially fragmented side view of the motor of the embodiment.
Figure 4:
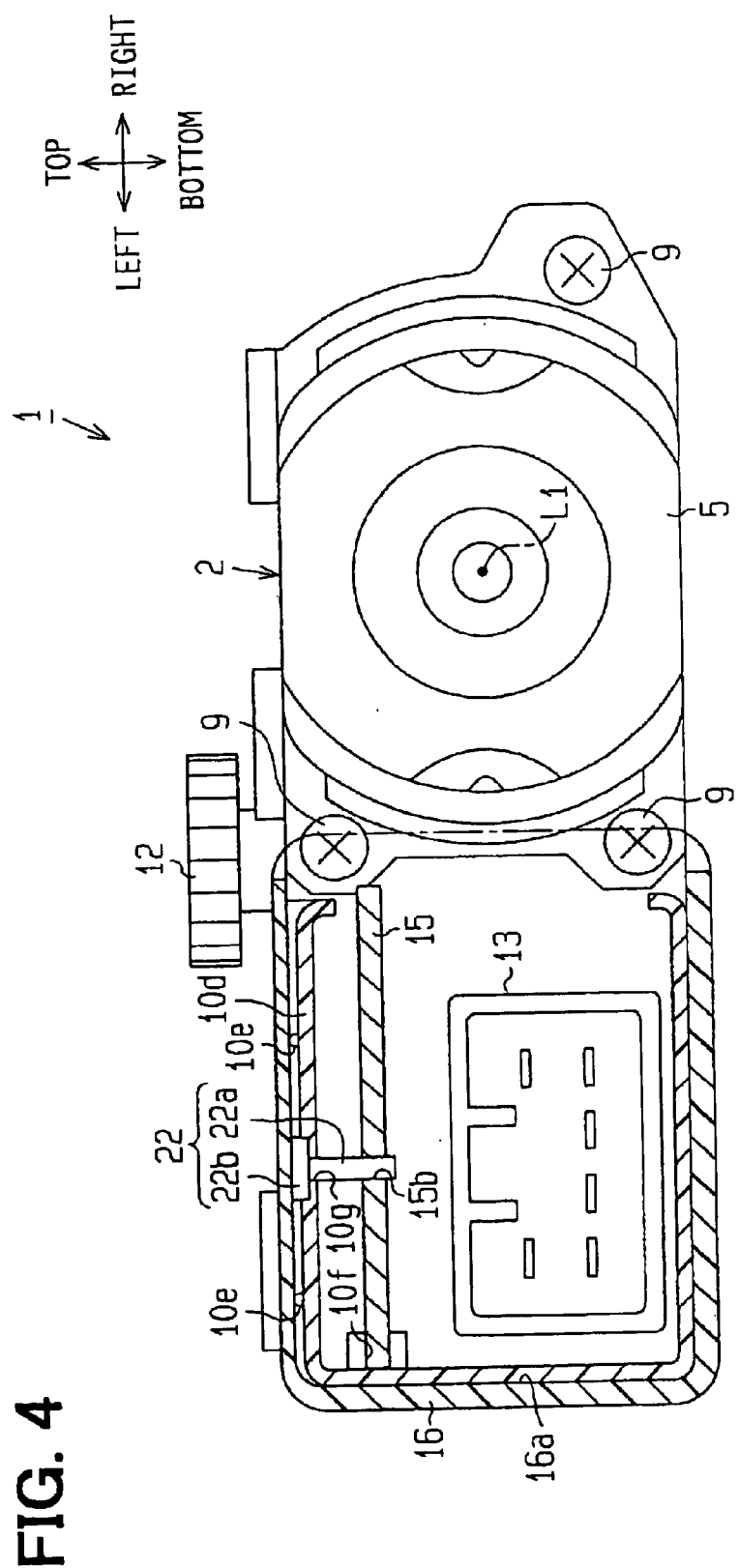
FIG. 4 is a cross sectional view of the motor of the embodiment.
Figure 5:
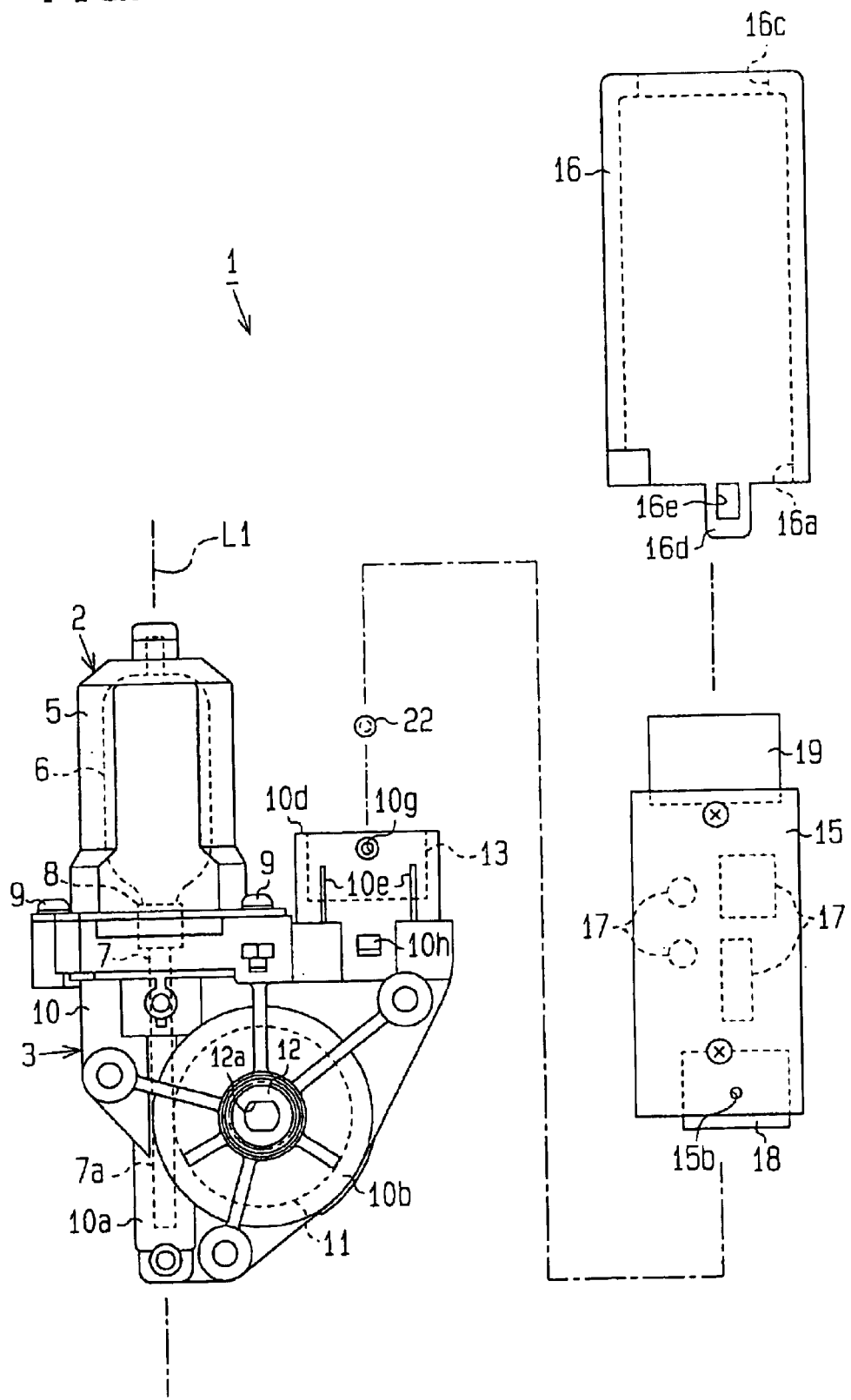
FIG. 5 is a deployed plan view of the motor of the embodiment.

A pin receiving through hole 10g penetrates through a center of a distal end of the upper wall of the fitting joint 10d (FIGS. 3–5). The pin receiving through hole 10g is formed in the wall of the gear housing 10 at a corresponding location, which is opposed to and is aligned with a fixing hole (a fixing portion) 15b of a control circuit board 15 in a direction perpendicular to an installation direction (the direction parallel to the axis L1 of the rotatable shaft 7) of the control circuit board 15 upon installation of the control circuit board 15 to the gear housing 10. A fixing pin 22 is inserted into the pin receiving through hole 10g from the outside to the inside of the fitting joint 10d in the direction perpendicular to the installation direction of the control circuit board 15.

The fixing pin 22 includes a pin main body 22a and a removal limiting portion 22b. The pin main body 22a is formed into a cylindrical shape, and the removal limiting portion 22b extends radially outward from a base end of the pin main body 22a and has a circular shape. A distal end of the pin main body 22a, which is opposite from the base end of the pin main body 22a, is inserted into the pin receiving through hole 10g until the removal limiting portion 22b engages an upper surface of the upper wall of the fitting joint 10d in FIG. 4. In a state where the control circuit board 15 is installed to the gear housing 10, i.e., in a state where the main body side connector 13 is electrically connected to the circuit board side connector 18, the distal end of the fixing pin 22 (the pin main body 22*a*) is received in the fixing hole 15*b* of the control circuit board 15, which penetrates through the wall of the control circuit board 15. The fixing pin 22 is engaged with the control circuit board 15 in a direction perpendicular to the inserting direction of the fixing pin 22 to limit movement of the control circuit board 15. Furthermore, an upper surface of the removal limiting portion 22*b* of the fixing pin 22 is received in the circuit board receiving case 16 fitted to the fitting joint 10*d* and is placed adjacent to an inner surface of the circuit board receiving case 16 to engage with the inner surface of the circuit board receiving case 16. More specifically, the circuit board receiving case 16 limits removal of the fixing pin 22 from the fitting joint 10*d* (the pin receiving through hole 10*g*) and maintains the engaged state of the fixing pin 22 relative to the control circuit board 15.

A widthwise center of a base end of an outer surface of each of the upper wall and the lower wall of the fitting joint 10*d* includes an anchoring projection 10*h* (FIG. 3). Each anchoring projection 10*h* is engaged with, i.e., is snap fitted to a corresponding one of anchoring pieces 16*d* of the circuit board receiving case 16 to limit removal of the circuit board receiving case 16 from the fitting joint 10*d*.

The main body side connector 13 is received in the fitting joint 10*d*. The main body side connector 13 is formed integrally with a brush holder (not shown), which holds power supply brushes (not shown) that are in sliding engagement with the commutator 8. The brush holder, which holds the power supply brushes, can be similar to a brush holder recited in, for example, U.S. Pat. No. 6,710,484, the disclosure of which is entirely incorporated herein by reference. Electric power is supplied from the main body side connector 13 to the power supply brushes. An installing direction of the circuit board side connector 18 of the control circuit board 15 relative to the main body side connector 13 is parallel to the direction of the axis L1 of the rotatable shaft 7. When the circuit board side connector 18 is connected to the main body side connector 13, the main body side connector 13 is electrically connected to the control circuit board 15. A vehicle body side connector (not shown), which extends from a vehicle body, is connectable with the main body side connector 13 in some cases. More specifically, in a case where the motor 1 does not require the control circuit board 15, the above arrangement allows direct connection of the vehicle body side connector to the main body side connector 13 to supply electrical power to the motor 1.

A guide groove (a guide portion) 10*f* extends along an inner surface of a left wall of the fitting joint 10*d* in FIG. 4 in the direction parallel to the axis L1 of the rotatable shaft 7 to guide a portion of the control circuit board 15 inserted into the fitting joint 10*d*.

As discussed above, the control device 4 includes the control circuit board 15, which controls the motor main body 2, and the circuit board receiving case 16, which receives the control circuit board 15. The control circuit board 15 is formed into a rectangular shape and has a plurality of electric circuit components 17, which constitute a control circuit and are provided in a wall surface 15*a* of the control circuit board 15. The circuit board side connector 18, which is connected to the main body side connector 13, is provided in one longitudinal end of the surface 15*a* of the control circuit board 15. The fixing hole 15*b* is formed as a circular fixing portion in the control circuit board 15 at a location adjacent to the circuit board side connector 18 to receive the distal end of the fixing pin 22 (the pin main body 22*a*). An inner diameter of the fixing hole 15*b* is slightly larger than an outer diameter of the fixing pin 22 (the pin main body 22*a*). The fixing pin 22 (the pin main body 22*a*) is simply inserted into the fixing hole 15*b* of the control circuit board 15, so that torsional stress is not substantially generated by the fixing pin 22 (the pin main body 22*a*) in the control circuit board 15.

An external connector 19, to which the vehicle body side connector (not shown) can be connected, is provided to the other longitudinal end of the surface 15*a* of the control circuit board 15. Specifically, the external connector 19 has a structure similar to that of the main body side connector 13. The control circuit board 15 supplies drive electric power, which is received from the vehicle body side connector through the external connector 19, to the main body side connector 13 from the circuit board side connector 18 through the control circuit formed on the control circuit board 15.

Figure 7:
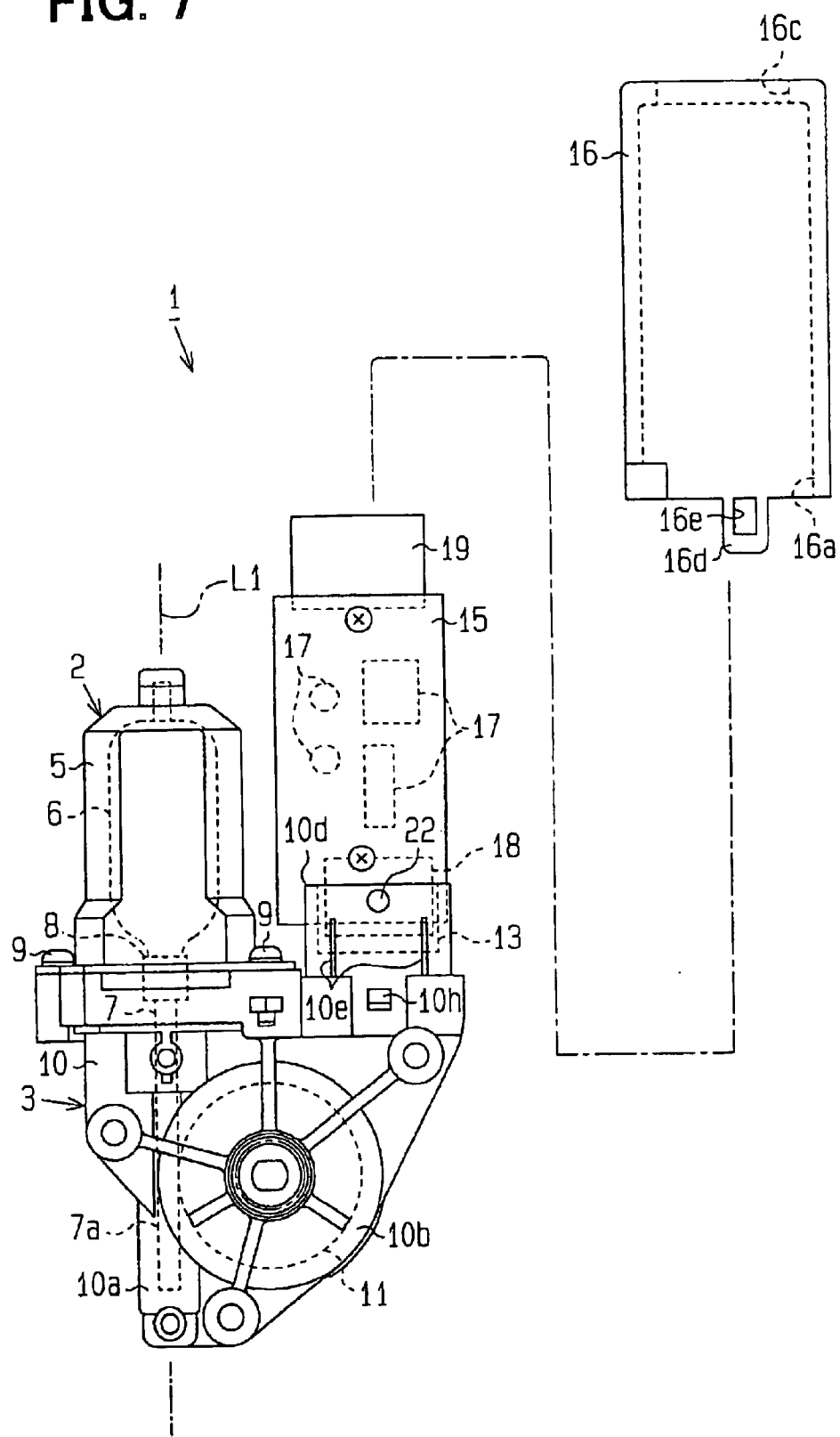
FIG. 7 is a deployed plan view of the motor of the embodiment.
Figure 8:
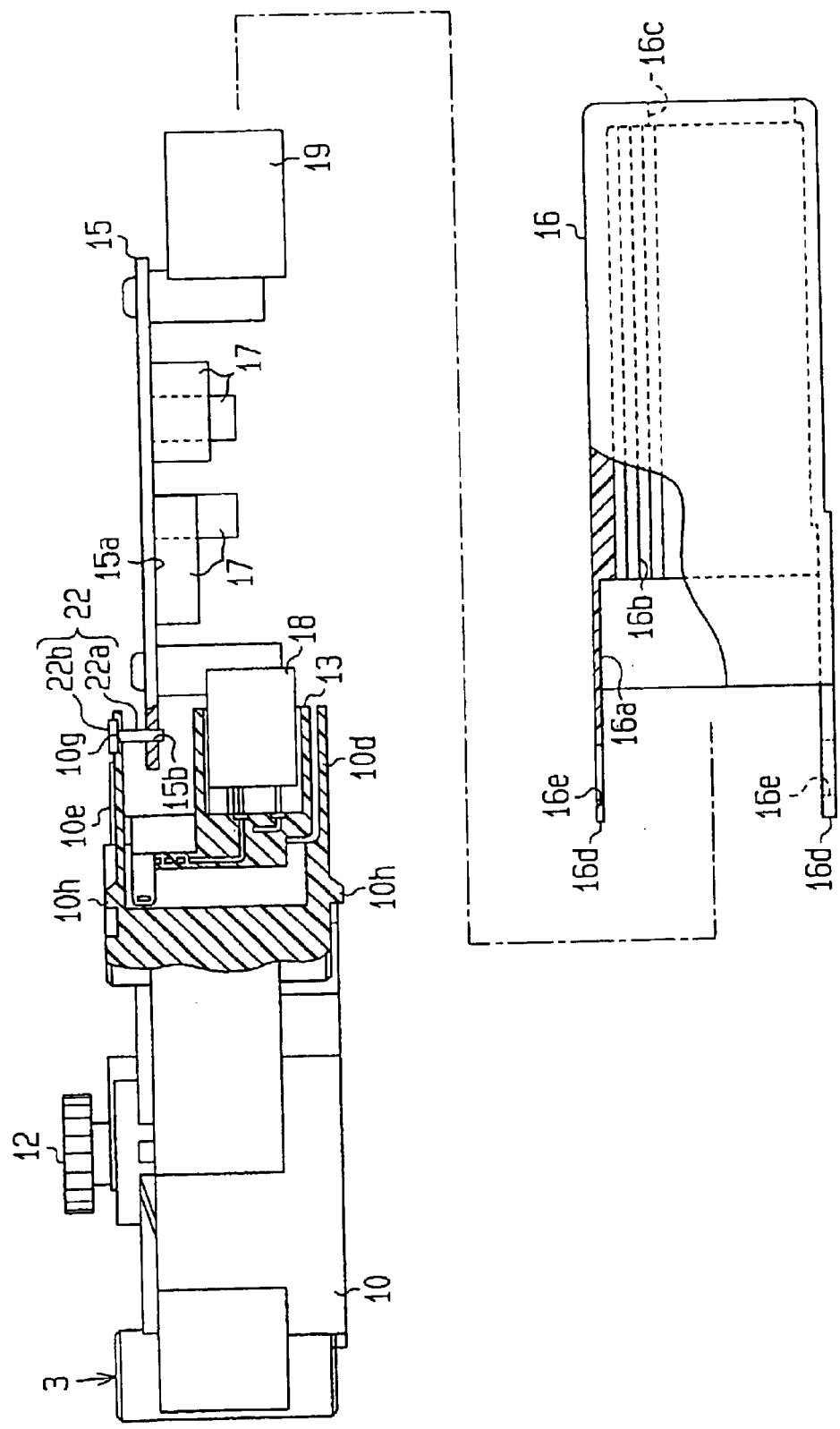
FIG. 8 is a partially fragmented, deployed side view of the motor of the embodiment.

When the circuit board side connector 18 is connected to the main body side connector 13 in the direction parallel to the axis L1 of the rotatable shaft 7, the control circuit board 15 is electrically and mechanically connected to the main body side connector 13 (FIGS. 7 and 8). In this case, the control circuit board 15 is arranged in such a manner that a plane of the control circuit board 15 is parallel to the plane of flattening of the gear housing 10 (the motor 1). Furthermore, in this case, the control circuit board 15 is inserted into and is guided along the guide groove 10*f* of the fitting joint 10*d*. Next, when the circuit board side connector 18 is connected to the main body side connector 13, the fixing pin 22 (the pin main body 22*a*) is inserted into the pin receiving through hole 10*g* of the fitting joint 10*d*, and the distal end of the fixing pin 22 is inserted into the fixing hole 15*b* of the control circuit board 15, as shown in FIGS. 7 and 8. Thus, the control circuit board 15 is engaged with the fixing pin 22 in a direction perpendicular to the inserting direction of the fixing pin 22 to limit movement of the control circuit board 15. In this way, for example, at the time of installing or removing the circuit board receiving case 16 relative to the gear housing 10, even when force, which likely causes substantial movement of the control circuit board 15, is applied to the control circuit board 15, movement of the control circuit board 15 in both the installation direction (first direction) and a removing direction (second direction) opposite from the installation direction is prevented to reduce stress applied to the connection between the main body side connector 13 and the circuit board side connector 18 due to the limitation of the movement of the control circuit board 15 by the fixing pin 22. Upon installation of the fixing pin 22 to the fitting joint 10*d* in the inserting direction (third direction), an opening (a gear housing side opening) 16*a* of the circuit board receiving case 16 is fitted to the fitting joint 10*d*, and the control circuit board 15 is received in the circuit board receiving case 16.

Figure 2:
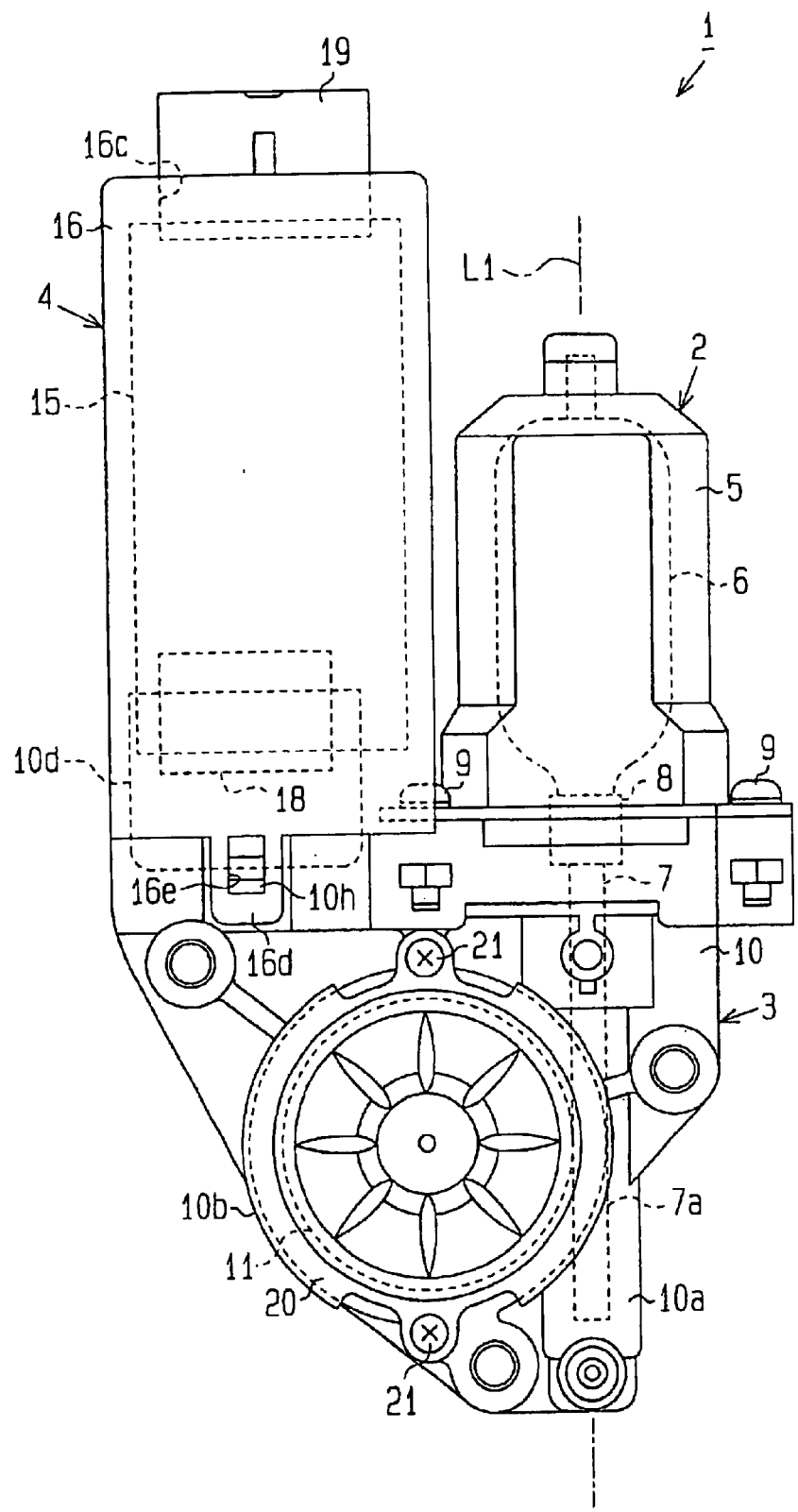
FIG. 2 is a bottom view of the motor of the embodiment.

Similar to the gear housing 10, the circuit board receiving case 16 is made of a resin material and is formed into a quadrangular cup shape. The opening 16*a* of the circuit board receiving case 16 is fitted to the fitting joint 10*d* of the gear housing 10 in the installation direction. At the opening 16*a* of the circuit board receiving case 16, the anchoring piece 16*d* is provided in each of the widthwise center of the upper wall and the widthwise center of the lower wall of the circuit board receiving case 16. Each anchoring piece 16*d* is formed as a quadrangular plate that extends in a plane of the corresponding one of the upper wall and the lower wall of the circuit board receiving case 16 and has resiliency in a direction perpendicular to the plane of the corresponding one of the upper wall and the lower wall of the circuit board receiving case 16. Furthermore, an anchoring through hole (or simply referred to as an anchoring hole) 16e penetrates through a center of each anchoring piece 16d to receive the corresponding anchoring projection 10h of the fitting joint 10d. When the circuit board receiving case 16 is fitted to the fitting joint 10d, a distal end of each anchoring piece 16d first engages a slope of the corresponding anchoring projection 10h and is then outwardly resiliently deformed by the slope of the corresponding anchoring projection 10h. When the entire anchoring projection 10h is received in the anchoring through hole 16e of the resiliently deformed anchoring piece 16d, the resiliently deformed anchoring piece 16d returns to its original shape. Thus, the anchoring piece 16d is securely engaged with the anchoring projection 10h. When each anchoring piece 16d is securely engaged with the corresponding anchoring projection 10h, the circuit board receiving case 16 is installed to the fitting joint 10d (the gear housing 10). In this embodiment, as shown in FIGS. 1 and 2, the circuit board receiving case 16 is held in a side by side relationship relative to the motor main body 2 in the plane of flattening of the gear housing 10 in a direction perpendicular to the axis L1 of the rotatable shaft 7 on a worm wheel receiving portion 10b side of the axis L1 of the rotatable shaft 7.

At the quadrangular tubular portion of the circuit board receiving case 16, a sidewall of the circuit board receiving case 16, which is located adjacent to the motor main body 2, extends in a direction parallel to the axis L1 of the rotatable shaft 7 along an imaginary extension of an axis of the adjacent screw 9, which is used to secure the motor main body 2 to the gear housing 10. More specifically, the side wall, which is located adjacent to the motor main body 2, is eliminated from the distal end of the opening 16a, so that the distal end of the opening 16a of the circuit board receiving case 16 has a horse shoe shaped cross section or a U-shaped cross section, as shown in FIG. 4. Thus, with this arrangement, it is possible to avoid interference between the distal end of the opening 16a of the circuit board receiving case 16 and the screw 9, which is used to secure the motor main body 2 (the yoke housing 5) to the gear housing 10. In other words, with this arrangement, the circuit board receiving case 16 can be positioned in close proximity to the motor main body 2, so that a size of the motor 1 can be reduced in the widthwise direction (the direction perpendicular to the direction of the axis L1) of the motor 1.

Figure 6:
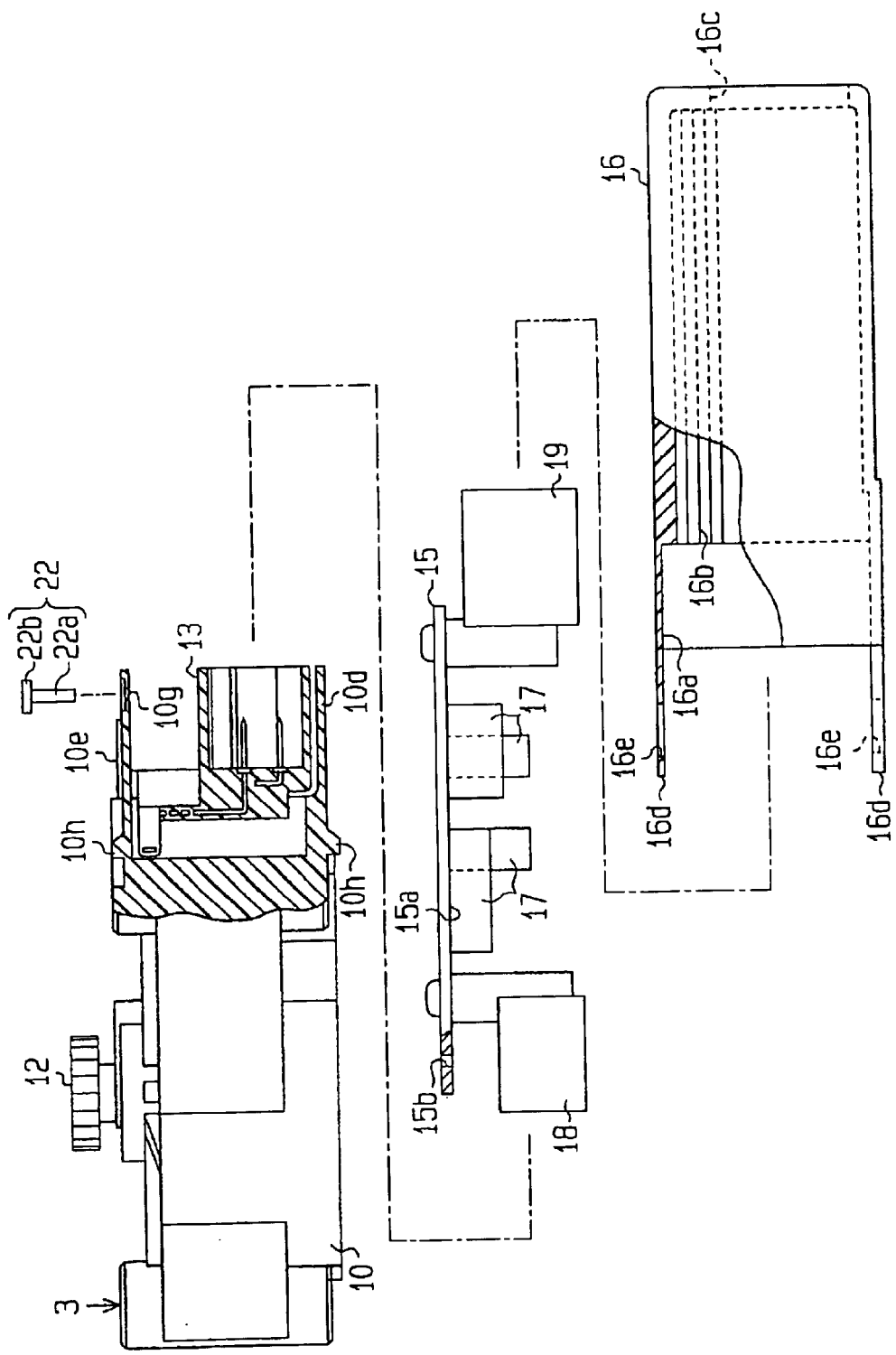
FIG. 6 is a partially fragmented, deployed side view of the motor of the embodiment.

As shown in FIGS. 6 and 8, guide grooves 16b extend along left and right inner side wall surfaces, respectively, of the circuit boar receiving case 16 from the opening 16a of the circuit board receiving case 16 in the direction parallel to the axis L1 of the rotatable shaft 7 to guide the control circuit board 15. In FIGS. 6 and 8, only one of the guide grooves 16b, which are formed in the left and right inner side wall surfaces, respectively, of the circuit boar receiving case 16, is shown. The guide grooves 16b and the guide groove 10f cooperate together to guide the control circuit board 15 and limit movement of the control circuit board 15 in a thickness direction (the vertical direction in FIG. 4) of the control circuit board 15, i.e., in a direction perpendicular to the plane of the wall of the control circuit board 15. A receiving through hole 16c penetrates through a base end wall (a wall located on a side opposite from the opening 16a) of the circuit board receiving case 16. The external connector 19 of the control circuit board 15 is received through the receiving through hole 16c to dispose the external connector 19 at the outside of the circuit board receiving case 16.

Upon installation of the control circuit board 15 to the gear housing 10 by connecting the circuit board side connector 18 of the control circuit board 15 to the main body side connector 13 and by inserting the fixing pin 22 into the through hole 15b of the control circuit board 15, the circuit board receiving case 16 is installed to the gear housing 10 in the direction parallel to the axis L1 of the rotatable shaft 7 in such a manner that the control circuit board 15 is received from the opening 16a of the circuit board receiving case 16 and is guided along the guide grooves 16b, and the opening 16a of the circuit board receiving case 16 is fitted to the fitting joint 10d. That is, the circuit board receiving case 16 is installed to the gear housing 10 in the direction that coincides with the installation direction of the motor main body 2 relative to the gear housing 10. When the circuit board receiving case 16 is fitted to the fitting joint 10d, the circuit board receiving case 16 is press fitted relative to the fitting joint 10d by the rattling limiting protrusions 10e provided in the fitting joint 10d. Thus, rattling movement of the circuit board receiving case 16 relative to the fitting joint 10d is limited. Furthermore, the fixing pin 22, which is installed to the fitting joint 10d, is also received in the circuit board receiving case 16 and engages the inner surface of the circuit board receiving case 16 to limit unintentional removal of the fixing pin 22 from the fitting joint 10d (the pin receiving through hole 10g) and to maintain the engagement between the fixing pin 22 and the control circuit board 15. In this way, the control device 4, which includes the control circuit board 15 and the circuit board receiving case 16, is externally connected to the gear housing 10 to form the motor 1.

When replacement of the control circuit board 15 is required, the anchoring pieces 16d of the circuit board receiving case 16 are outwardly flexed to release engagement between the anchoring pieces 16d and the anchoring projections 10h, and the circuit board receiving case 16 is removed from the gear housing 10 in the removing direction, which is opposite from the installation direction. Next, the fixing pin 22 is removed, and the control circuit board 15 is removed from the main body side connector 13. In this way, replacement of the control circuit board 15 is eased.

Next, characteristic operation of the motor 1 of the present embodiment will be described.

(1) Upon installation of the control circuit board 15 to the gear housing 10 by connecting the circuit board side connector 18 to the main body side connector 13 of the gear housing 10, the fixing pin 22 is installed to the gear housing 10 and is inserted into the fixing hole 15b of the control circuit board 15 to limit movement of the control circuit board 15. Then, the control circuit board receiving case 16 is installed to the gear housing 10 while the fixing pin 22 is installed to the control circuit board 15. In this way, at the time of installing or removing the circuit board receiving case 16 relative to the gear housing 10, when force, which likely causes substantial movement of the control circuit board 15, is applied to the control circuit board 15, movement of the control circuit board 15 is substantially limited by the fixing pin 22, and thereby stress applied to the connection between the main body side connector 13 and the circuit board side connector 18 is reduced. Thus, even when the force, which likely causes substantial movement of the control circuit board 15, is applied to the control circuit board 15, damage to the control circuit board 15 can be effectively limited. Furthermore, the fixing pin 22 is simply inserted into the fixing hole 15b of the control circuit board 15, so that, for example, torsional stress is not generated in the control circuit board 15. Thus, damage to the control circuit board 15 is further effectively limited.

(2) The pin receiving through hole 10g is formed in the gear housing 10 at the corresponding location, which is opposed to and is aligned with the fixing hole 15*b* of the control circuit board 15 in the direction perpendicular to the installation direction (the direction of the axis L1) of the control circuit board 15. The fixing pin 22, which is engaged with the control circuit board 15, includes the pin main body 22*a* and the removal limiting portion 22*b*. The pin main body 22*a* is inserted into the fixing hole 15*b*, and the removal limiting portion 22*b* extends radially outward from the base end of the pin main body 22*a*. The fixing pin 22 is installed to the gear housing 10 (the fitting joint 10*d*) in the direction perpendicular to the installation direction of the control circuit board 15 in such a manner that the pin main body 22*a* is inserted into the pin receiving through hole 10*g* until the removal limiting portion 22*b* engages the gear housing 10 (the fitting joint 10*d*). In this way, the control circuit board 15 is held by the simple fixing pin 22, and manufacturing of such simple fixing pin 22 (a fixing means) is relatively easy. Furthermore, the fixing pin 22 is simply inserted into the pin receiving through hole 10*g* of the gear housing 10, so that installation of the fixing pin 22 is relatively simple.

(3) The fixing pin 22 is received in the circuit board receiving case 16, and the removal limiting portion 22*b* engages the inner surface of the circuit board receiving case 16, so that removal of the fixing pin 22 from the pin receiving thorough hole 10*g* is limited. Thus, a dedicated means for limiting removal of the fixing pin 22 from the pin receiving through hole 10*g* is not required.

(4) The gear housing 10 includes the fitting joint 10*d*, which is fitted into the opening 16*a* of the circuit board receiving case 16. Thus, the gear housing 10 and the circuit board receiving case 16 can be securely connected together by fitting the fitting joint 10*d* of the gear housing 10 into the circuit board receiving case 16.

(5) The fitting joint 10*d* has the hollow interior, and the main body side connector 13 is arranged in the hollow interior of the fitting joint 10*d*. Thus, a space occupied by the fitting joint 10*d* and the main body side connector 13 can be minimized. This allows a reduction in a size of the gear housing 10 and thereby a reduction in a size of the entire motor 1.

(6) The portion of the control circuit board 15 is inserted into the fitting joint 10*d*, and the guide groove 10*f* is provided in the fitting joint 10*d* to guide the portion of the control circuit board 15. Thus, unnecessary movement of the control circuit board 15 is limited by the guide groove 10*f*, so that substantial rattling movement of the control circuit board 15 is limited.

(7) The rattling limiting protrusions 10*e* are formed in the outer surface of the fitting joint 10*d* to aid in the press fitting of the fitting joint 10*d* to the opening 16*a* of the circuit board receiving case 16. With this arrangement, the fitting joint 10*d* is press fitted into the opening 16*a* of the circuit board receiving case 16, and thereby the circuit board receiving case 16 is installed to the gear housing 10 without causing rattling movement of the circuit board receiving case 16 relative to the gear housing 10.

(8) The circuit board receiving case 16 includes the guide grooves 16*b*, which are formed in the left and right inner side wall surfaces of the circuit board receiving case 16 to guide the control circuit board 15 inserted into the circuit board receiving case 16 from the opening 16*a*. Thus, unnecessary movement of the control circuit board 15 is limited by the guide grooves 16*b*, and thereby substantial rattling movement of the control circuit board 15 is limited.

(9) The circuit board receiving case 16 is held in a side by side relationship relative to the motor main body 2 in the plane of flattening of the gear housing 10 in the direction perpendicular to the rotatable shaft 7 on the worm wheel receiving portion 10*b* side of the rotatable shaft 7. Thus, protrusion of the circuit board receiving case 16 in the direction perpendicular to the plane of flattening of the gear housing 10 (the motor 1) is minimized, and the circuit board receiving case 16 is arranged in a space, which is bounded on the motor main body 2 and the gear housing 10 (the worm wheel receiving portion 10*b*). As a result, a size of the motor 1 is minimized.

(10) The motor main body 2 is installed to the gear housing 10 in the direction parallel to the axis L1 of the rotatable shaft 7, and the circuit board receiving case 16 is installed to the gear housing in the direction that coincides with the installation direction of the motor main body 2 to the gear housing 10. Thus, the installation direction of the motor main body 2 and the installation direction of the circuit board receiving case 16 coincide with each other, allowing easy assembly of the motor 1. As a result, the motor 1 is suitable for automatic assembly.

The above embodiment can be modified as follows.

Figure 9:
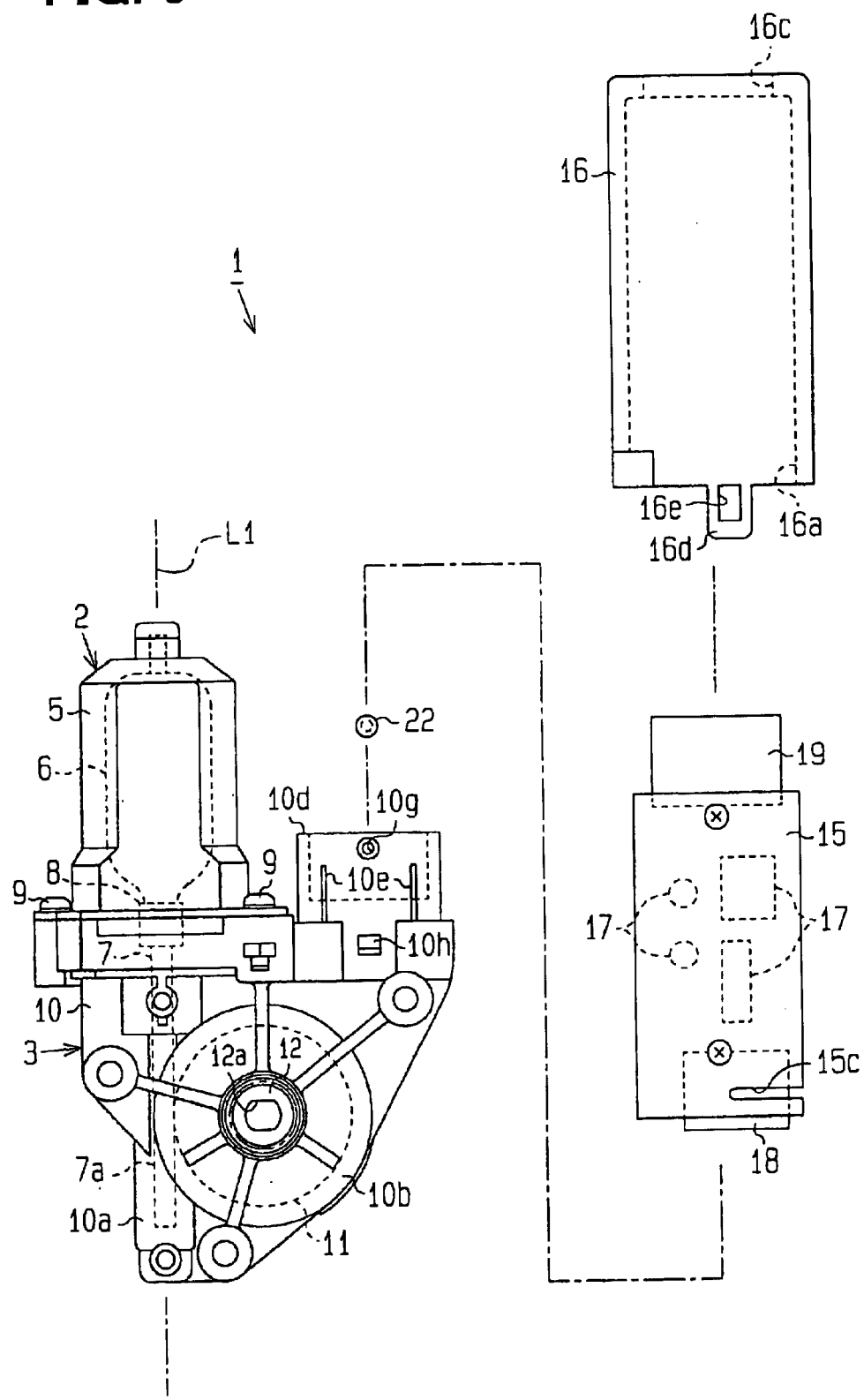
FIG. 9 is a deployed plan view showing a modification of the motor of the embodiment.
Figure 10:
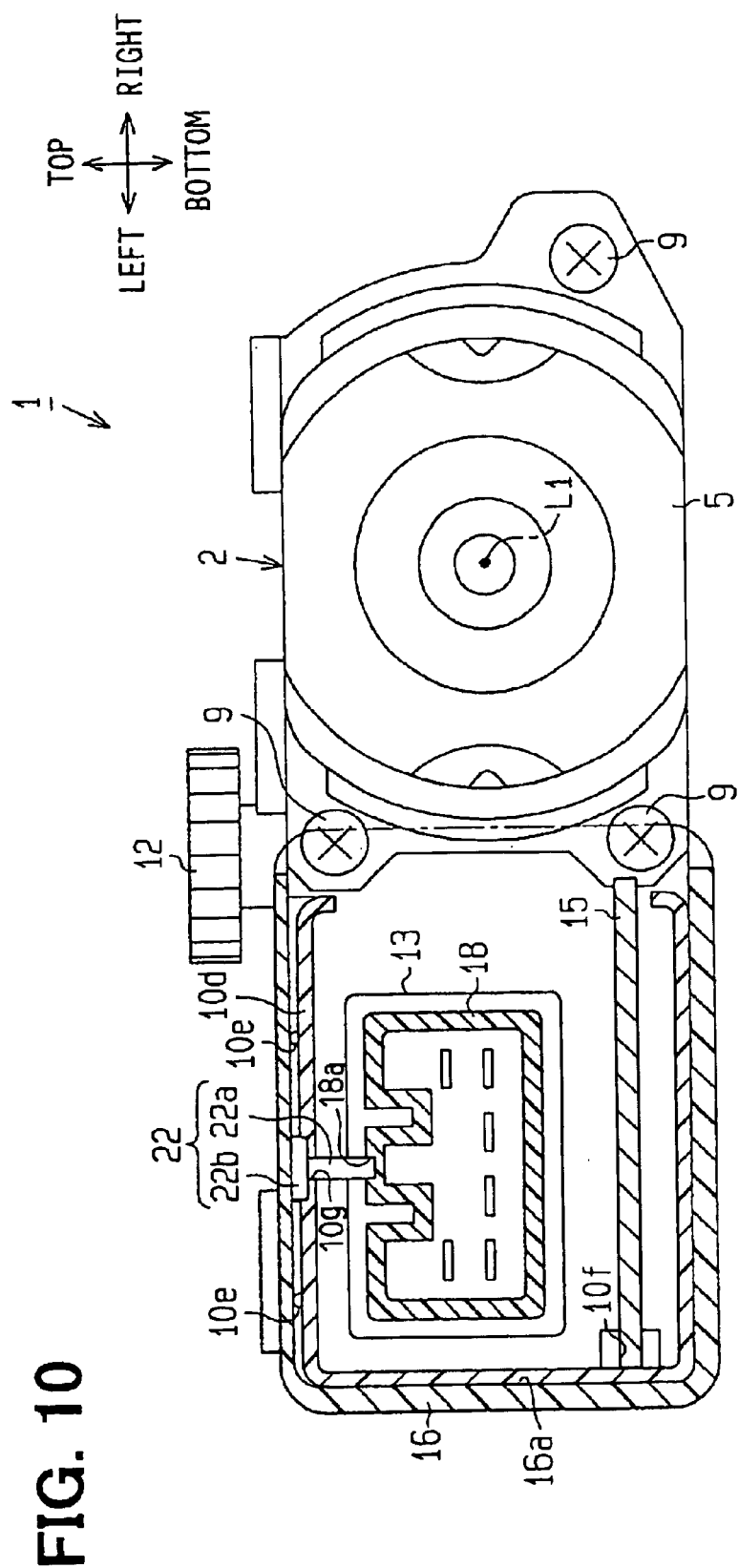
FIG. 10 is a cross sectional view showing another modification of the motor of the embodiment.

In the above embodiment, the fixing hole 15*b*, which has the circular cross section, is formed in the control circuit board 15 to serve as the fixing portion, which receives and engages the fixing pin 22. However, the shape of the fixing portion and the position of the fixing portion are not limited to the above ones. For example, as shown in FIG. 9, a fixing recess 15*c* can be provided in the control circuit board 15 in place of the fixing hole 15*b*. The recess 15*c* extends in a direction perpendicular to the inserting direction of the control circuit board 15. Further alternatively, as shown in FIG. 10, a fixing groove 18*a* can be formed in the circuit board side connector 18, which is mounted to the control circuit board 15. Furthermore, two or more of the fixing hole 15*b*, the fixing recess 15*c* and the fixing groove 18*a* can be provided in any appropriate combination.

In the above embodiment, the fixing pin 22, which includes the pin main body 22*a* and the removal limiting portion 22*b*, is inserted into the pin receiving through hole 10*g* of the fitting joint 10*d*, and the pin main body 22 is inserted into the fixing hole 15*b* of the control circuit board 15 to limit movement of the control circuit board 15. However, the present invention is not limited to this arrangement, and this arrangement can be modified in any appropriate manner.

In the above embodiment, the fixing pin 22 is received in the circuit board receiving case 16, and the removal limiting portion 22*b* engages the inner surface of the circuit board receiving case 16 to limit removal of the fixing pin 22 from the pin receiving through hole 10*g*. Alternatively, any other measure can be used to limit removal of the fixing pin 22.

In the above embodiment, the circuit board receiving case 16 is installed to the gear housing 10 through engagement of the anchoring pieces 16*d* of the circuit board receiving case 16 with the anchoring projections 10*h* of the gear housing 10. Alternatively, any other measure can be taken to install the circuit board receiving case 16 to the gear housing 10.

In the above embodiment, the fitting joint 10*d* is provided in the gear housing 10 and is fitted into the opening 16*a* of the circuit board receiving case 16. The shape of the fitting joint 10*d* is not limited to the above one. Furthermore, the fitting joint 10*d* can be eliminated, if desired.

In the above embodiment, the shape of each rattling limiting protrusion 10*e* is not limited to the above one and can be changed to any suitable one. Furthermore, the rattling limiting protrusions 10*e* can be eliminated, if desired.

In the above embodiment, the shape of each guide groove 10f, 16b is not limited to the above one and can be modified in any appropriate manner. Furthermore, the guide grooves 10f, 16b can be eliminated.

In the above embodiment, the circuit board receiving case 16 is installed to the gear housing 10 in the direction parallel to the axis L1 of the rotatable shaft 7. However, the circuit board receiving case 16 can be installed to the gear housing 10 in any other direction.

In the above embodiment, the circuit board receiving case 16 is held in a side by side relationship relative to the motor main body 2 in the direction perpendicular to the rotatable shaft 7. However, the circuit board receiving case 16 can be arranged in any other appropriate manner.

In the above embodiment, the present invention is embodied in the motor 1 (the power source) of the vehicle sunroof system. However, the present invention can be embodied in a motor of any other system or device.

Additional advantages and modifications will readily occur to those skilled in the art. The invention in its broader terms is therefore not limited to the specific details, representative apparatus, and illustrative examples shown and described.

What is claimed is:

1. A motor comprising:
   a motor main body that includes a rotatable shaft, which is rotated upon energization of the motor main body;
   a gear housing that is joined to the motor main body and receives an output shaft and a speed reducing mechanism, wherein the speed reducing mechanism reduces a rotational speed of the rotatable shaft and conducts the reduced rotational speed of the rotatable shaft to the output shaft, and the gear housing has a main body side connector, from which electric power is supplied to the motor am body;
   a control device that controls the motor main body and includes a control circuit board and a circuit board receiving case, wherein:
      the control circuit board is received in the circuit board receiving case without being directly joined to the circuit board receiving case and has a circuit board side connector;
      the circuit board side connector is installed to the main body side connector in a first direction to supply electric power to the motor main body through the main body side connector; and
      the circuit board receiving case includes a gear housing side opening that is installed to the gear housing in the first direction to receive the control circuit board in the circuit board receiving case; and
      a fixing means for releasably fixing the control circuit board to the gear housing to prevent movement of the control circuit board relative to the gear housing in a second direction, which is opposite from the first direction.

2. The motor according to claim 1, wherein the fixing means is for releasably fixing the control circuit board to the gear housing to prevent movement of the control circuit board relative to the gear housing also in the first direction.

3. The motor according to claim 1, wherein the gear housing side opening of the circuit board receiving case is snap fitted to the gear housing.

4. The motor according to claim 1, wherein the gear housing includes a fitting joint, which is fitted in to the gear housing side opening of the circuit board receiving case.

5. The motor according to claim 4, wherein the fitting joint of the fear housing has a follow interior and receives the main body side connector in the hollow interior.

6. The motor according to claim 4, wherein the fitting joint of the gear housing receives a portion of the control circuit board and includes a guide portion, which guides the portion of the control circuit board.

7. The motor according to claim 4, wherein an outer peripheral surface of the fitting joint include at least one protrusion, which aids in press fitting of the fitting joint into the gear housing side opening of the circuit board receiving case.

8. The motor according to claim 1, wherein:
   the gear housing includes a speed reducing mechanism receiving portion, which receives the speed reducing mechanism;
   the gear housing is generally flattened such that the speed reducing mechanism receiving portion extends on one side of the rotatable shaft in a direction perpendicular to the rotatable shaft; and
   the circuit board receiving case is arranged in a side by side relationship relative to the motor main body in a plane parallel to a plane of flattening of the flattened gear housing in the direction perpendicular to the rotatable shaft on the one side of the rotatable shaft.

9. The motor according to claim 1, wherein:
   the gear housing includes a speed reducing mechanism receiving portion, which receives the speed reducing mechanism;
   the gear housing is generally flattened such that the speed reducing mechanism receiving portion extends on one side of the rotatable shaft in a direction perpendicular to the rotatable shaft; and
   the circuit board receiving case is arranged in a side by side relationship relative to the motor main body in a plane parallel to a plan of flattening of the flattened gear housing in the direction perpendicular to the rotatable shaft on the one side of the rotatable shaft.

10. The motor according to claim 1, wherein:
    the motor main body is installed to the gear housing in a direction parallel to an axis of the rotatable shaft; and
    the circuit board receiving case is installed to the gear housing in the first direction, which is parallel to the axis of the rotatable shaft.

11. A motor comprising:
    a motor main body that includes a rotatable shaft which is rotated upon energization of the motor main body;
    a gear housing that is joined to the motor main body and receives an output shaft and a speed reducing mechanism, wherein the speed reducing mechanism reduces a rotational speed of the rotatable shaft and conducts the reduced rotational speed of the rotatable shaft to the output shaft, and the gear housing has a main body side connector, from which electric power is supplied to the motor main body;
    a control device that controls the motor main body and includes a control circuit board and a circuit board receiving case, wherein:
       the control circuit board is received in the circuit board receiving case without being directly joined to the circuit board receiving case and has a circuit board side connector;
       the circuit board side connector is installed to the main body side connector in a first direction to supply electric power to the motor main body through the main body side connector; and
       the circuit board receiving case includes a gear housing side opening that is installed to the gear housing in the first direction to receive the control circuit board in the circuit board receiving case; and a fixing means for releasably fixing the control circuit board to the gear housing to prevent movement of the control circuit board relative to the gear housing in a second direction, which is opposite from the first direction, wherein:

the control circuit board has a fixing portion, which is formed in one of the circuit board side connector and a wall of the control circuit board;

the gear housing includes a pin receiving through hole that penetrates through a wall of the gear housing in a third direction, which is perpendicular to the first direction, wherein the pin receiving through hole of the gear housing is aligned with the fixing portion in the third direction;

the fixing means includes a fixing pin, which includes a pin main body and a removal limiting portion;

the removal limiting portion extends radially outward from a base end of the pin main body, which is opposite from a distal end of the pin main body and is located apart from the fixing portion; and the distal end of he pin main body is inserted through the pin receiving through hole of the gear housing and is stalled to the fixing portion, so that the removal limiting portion engages the wall of the ear housing around the pin receiving through hole of the gear housing.

12. The motor according to claim 11, wherein the fixing portion is formed in the wall of the control circuit board as a fixing through hole, which penetrates through the wall of the control circuit board in the third direction.

13. The motor according to claim 11, wherein:

the fixing pin is entirely received in the circuit board receiving case; and a wall of the circuit board receiving case is located adjacent to the removal limiting portion of the fixing pin to limit removal of the fixing pin from the pin receiving through hole of the gear housing upon engagement of the wall of the circuit board receiving case with the removal limiting portion of the fixing pin.

* * * * *